United States Patent

Kuratate et al.

[11] Patent Number: 5,198,151
[45] Date of Patent: Mar. 30, 1993

[54] FERROELECTRIC LIQUID CRYSTAL COMPOSITION

[75] Inventors: Tomoaki Kuratate; Mitsuhiro Koden, both of Nara; Fumiaki Funada, Yamatokoriyama, all of Japan

[73] Assignee: Sharp Kabushiki Kaisha, Osaka, Japan

[21] Appl. No.: 505,697

[22] Filed: Apr. 6, 1990

[30] Foreign Application Priority Data

Apr. 10, 1989 [JP] Japan .................................. 1-90935
Jul. 31, 1989 [JP] Japan ................................. 1-200047

[51] Int. Cl.$^5$ ...................... C09K 19/12; C07C 69/76
[52] U.S. Cl. .................................. 252/299.66; 560/59; 560/65; 252/299.61; 252/299.63; 252/299; 252/65; 252/299.67
[58] Field of Search .................. 252/299.66, 299.01; 560/59, 65

[56] References Cited

U.S. PATENT DOCUMENTS

| | | | |
|---|---|---|---|
| 4,162,988 | 7/1979 | Maze et al. | 252/299.65 |
| 4,393,231 | 7/1983 | Misaki et al. | 252/299.5 |
| 4,481,149 | 11/1984 | Misaki et al. | 252/299.5 |
| 4,650,600 | 3/1987 | Heppke et al. | 252/299.66 |
| 4,871,469 | 10/1989 | Reiffenrath et al. | 252/299.66 |
| 4,886,619 | 12/1989 | Janulis | 252/299.66 |
| 4,918,213 | 4/1990 | Nohira et al. | 252/299.66 |
| 4,921,632 | 5/1990 | Nakamura et al. | 252/299.66 |
| 5,082,587 | 1/1992 | Janulis | 252/299.66 |

FOREIGN PATENT DOCUMENTS

| | | |
|---|---|---|
| 0237007 | 9/1987 | European Pat. Off. |
| 0255236 | 2/1988 | European Pat. Off. |
| 0267585 | 5/1988 | European Pat. Off. |
| 0301511 | 2/1989 | European Pat. Off. |

Primary Examiner—Robert L. Stoll
Assistant Examiner—Philip Tucker
Attorney, Agent, or Firm—Nixon & Vanderhye

[57] ABSTRACT

A ferroelectric liquid crystal composition suitable to large capacity display which contains from 0.01 to 1% by weight of a liquid crystal or liquid crystal-compatible compound having a fluoroalkyl group in ferroelectric liquid crystals exhibiting a smectic C phase.

4 Claims, 3 Drawing Sheets

FERROELECTRIC LIQUID CRYSTAL COMPOSITION

BACKGROUND OF THE INVENTION

1. Field of the Invention

The present invention concerns a ferroelectric liquid crystal composition and, more in particular, it relates to a ferroelectric liquid crystal composition of high speed response and memory characteristics and suitable to large capacity display.

2. Description of the Prior Art

As liquid crystal display devices those utilizing nematic liquid crystals such as TN (twisted nematic) type, STN (super twisted nematic) type, DST (double layer super twisted nematic) type and active matrix type, etc. have been used predominantly. However, it is difficult with TN, STN and DST type devices for large capacity display of more than 1,000 lines due to the restriction on the threshold margin. Further, the active matrix type is expensive because of the complicated panel structure and involves a problem in view of the production yield. In addition, any of TN, STN, DST and active matrix types involves a drawback of "narrow view angle" so long as they are based on the in TN mode as for display principle of liquid crystals.

On the other hand, in SSP (surface stabilized ferroelectric) type ferroelectric liquid crystal display using ferroelectric liquid crystals in the chiral smectic C phase [N. A. Clark, et. al. "Appl. Phys. Lett.," 36, 899 (1980)], the response mode of liquid crystal molecules to electric fields is quite different from conventional liquid crystal display devices utilizing the nematic phase. Accordingly, high speed response and memory characteristics that could not be obtained in the conventional nematic liquid crystals can be obtained, which enables large capacity display and, in addition, they have the advantage of wider view angle as compared with conventional nematic type liquid crystals.

There are various physical properties and characteristics required for liquid crystal materials used in ferroelectric liquid crystal devices, and it is demanded to satisfy the following conditions that are:

(1) operable and storable within a wide temperature range around room temperature like that in conventional nematic liquid crystal display devices,
(2) chemically stable,
(3) enabled for low voltage driving and have
(4) rapid memory characteristic required for obtaining display quality with no flicker as a display device having scanning lines by the number of greater than 1,000 lines,
(5) satisfactory orientation property, and
(6) appropriate tilting angle, etc.

However, it is extremely difficult at present to satisfy all of such required conditions with a single compound and, therefore, a plurality of compounds mixed into a liquid crystal composition is applied as a device. At present, for manufacturing liquid crystals capable of satisfying such demands, the following means have often been employed:

(1) a compound of great spontaneous polarization is added to a liquid crystal composition that exhibits a smectic C phase, or
(2) a compound is added to a compound having an extremely rapid response and memory characteristics for lowering the viscosity or controlling the transition temperature.

However, it can not be said at present that high speed response required for a large capacity display can be obtained and only small values can be obtained also for memory angles in most of cases.

Further, referring to the memory characteristics of ferroelectric liquid crystals, there is problem that a bistable memory state is difficult to obtain with a material having a large spontaneous polarization Ps considered to be necessary for the development of high speed response as shown in the presentation by Yoshida et. al., in 13th Meeting For Liquid Crystals (1987, Lecture No. 2Z15, Preparatory Report pp. 142-143).

Besides, it is known to add about 2-9% of a liquid crystal compound containing fluoroalkyl group to a chiral smectic liquid crystal composition [see Japanese Unexamined Patent Publication No. 63(1988)-27451].

SUMMARY OF THE INVENTION

Under the foregoing situations, the present inventors have considered that characteristics of ferroelectric liquid crystal display devices such as response and memory characteristics depend not only on the bulk property, orientation technique for liquid crystal material, and the cell constitution, but strongly depend on the interaction at the boundary between liquid crystals and the substrate and have made an earnest study with an aim of improving the device characteristics by improving the interacting portions between the liquid crystals and the substrate.

As a result, we have accomplished the present invention based on the finding that a ferroelectric liquid crystal composition remarkably improved with the response property and memory characteristics can be obtained by adding a perfluoroalkyl-containing liquid crystal or liquid crystal-compatible compound by a specified small amount to a ferroelectric liquid crystal composition as a basic material (the composition is hereinafter sometimes referred to as basic liquid crystals).

Thus, according to the present invention, there is provided a ferroelectric liquid crystal composition, in which a liquid crystal or liquid crystal-compatible compound containing a perfluoroalkyl group is incorporated by from 0.01 to 1% by weight to a liquid crystal composition exhibiting smectic C phase.

DESCRIPTION OF THE PREFERRED EMBODIMENTS

Figure 1:
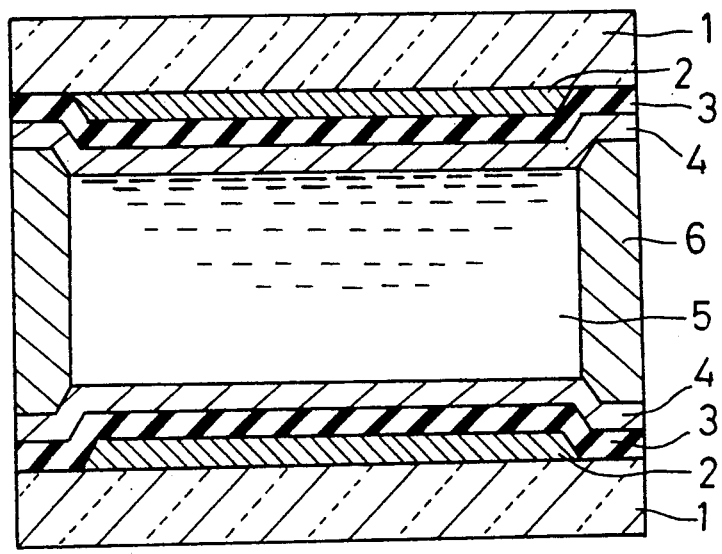
FIG. 1 is a view illustrating a constitution of a liquid crystal cell used for one embodiment according to the present invention.

In the present invention, the perfluoroalkyl-containing liquid crystal or liquid crystal-compatible compound is used not for utilizing the liquid crystal property or chiral property thereof but used for improving the interaction at the boundary between the liquid crystal and the substrate due to the perfluoroalkyl group in the compound. Therefore, any of compounds can be used so long as they give no undesired effect on the phase transition temperature of the basic liquid crystals, physical property of the phase series, etc., can be compatible therewith with no separation and are not reactive with the basic liquid crystals, and even those liquid crystal compounds not having liquid crystal property or chiral property can be used generally. The term of a liquid crystal-compatible compound containing a perfluoroalkyl group means a compound which itself does not show liquid crystal state but has at least one perfluoroalkyl group and is compatible to the basic (ferroelectric) liquid crystal composition.

Examples of suitable perfluoroalkyl-containing liquid crystal or liquid crystal-compatible compounds include those compounds having two or more of bivalent 6-membered rings containing groups and at least one fluoroalkyl group represented by $C_nF_{2n+1}$ (n=1–10) at the terminal (group A) or those compounds having at least one steroid skelton and at least one $C_nF_{2n+1}$ group (group B).

Examples of the group A compounds include those liquid crystal or liquid crystal-compatible compound represented by the following formula (I):

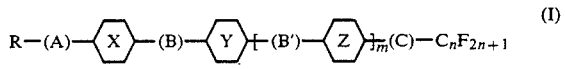

(I)

-continued

<div style="text-align:center">where ⟨X⟩, ⟨Y⟩ and ⟨Z⟩</div> each represents a benzene, cyclohexene, pyridine, pyrimidine, pyridazine, pyrazine or (2,2,2)-bicyclooctane ring, in which one or more of the hydrogen atoms may be substituted with F, Cl, Br, CN, $CH_3$, $CH_3O$, $NO_2$, etc., R represents a linear or branched alkyl or perfluoroalkyl group containing 1 to 12 carbon atoms;

A represents a single bond or a group of —O—, —COO—, —OCO—, —CH$_2$O—, —OCH$_2$—, —C≡C— or —CH$_2$CH$_2$—;

B and B' each represent a single bond or a group of —O—, —COO—, —OCO—, —CH$_2$O—, —OCH$_2$—, —C≡C— or —CH$_2$CH$_2$—;

C represents a single bond or a group of —O—, —COO—, —OCO—, —R$_1$—, —OR$_1$—, —COOR$_1$— or —OCOR$_1$—, in which R$_1$ represents a linear or branched alkylene group containing 1 to 8 carbon atoms, and m is an integer of 0 or 1.

Preferable compounds of the group (A) are as follows:

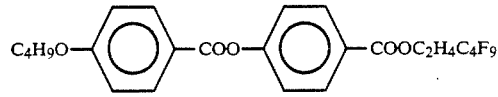

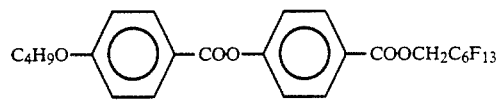

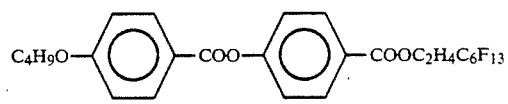

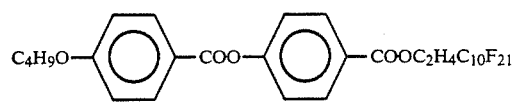

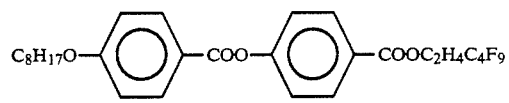

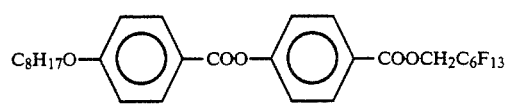

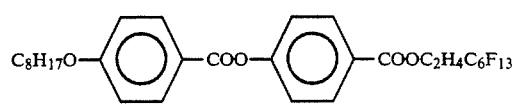

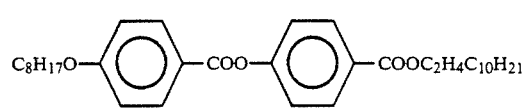

-continued
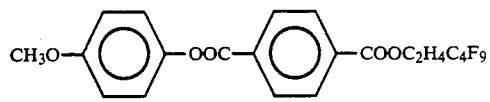
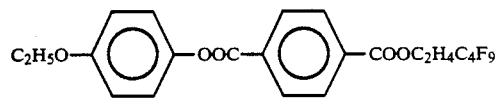
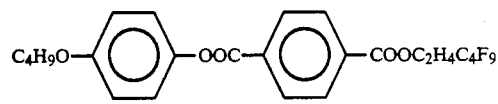
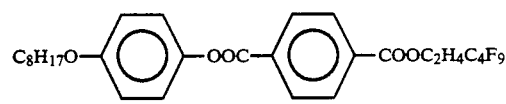
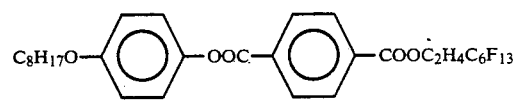
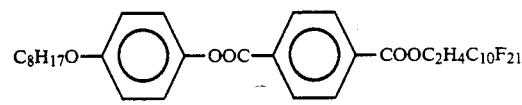
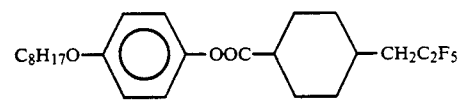
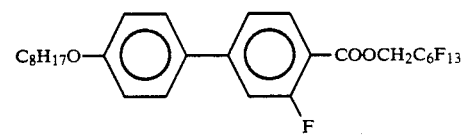
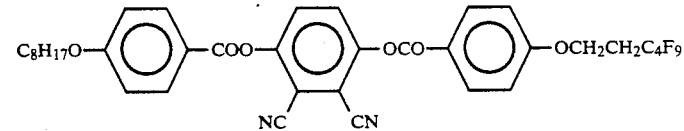
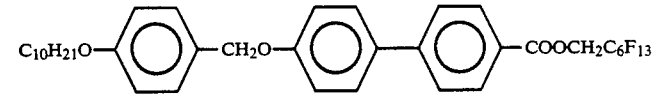
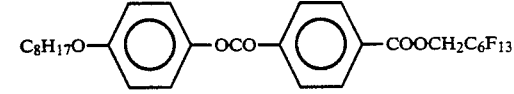
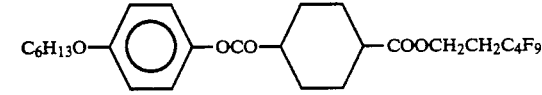
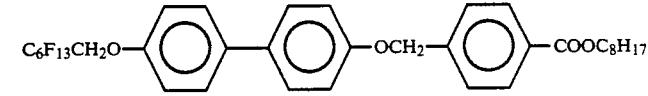

-continued
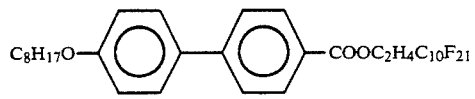
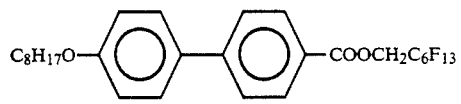
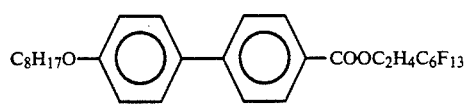
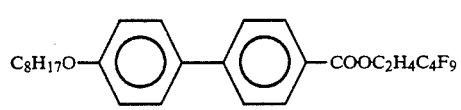
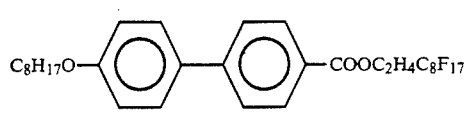
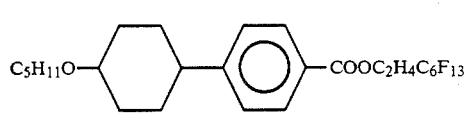
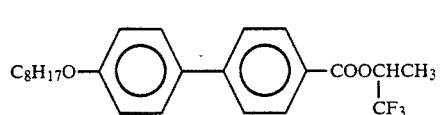
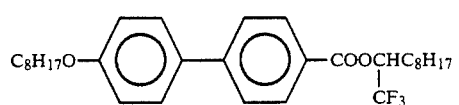
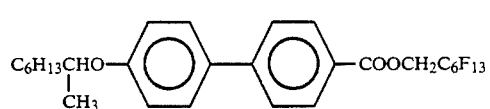
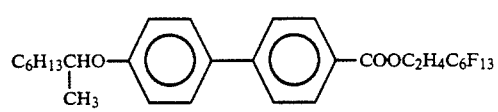
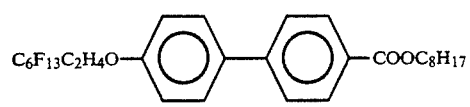
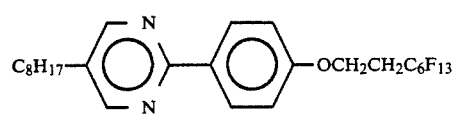
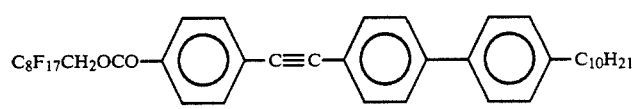

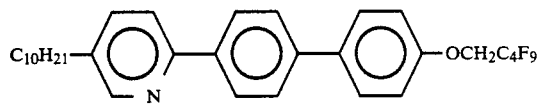
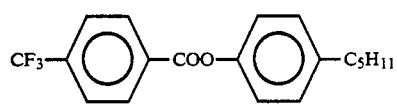
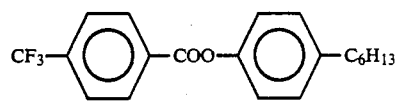
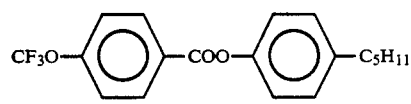
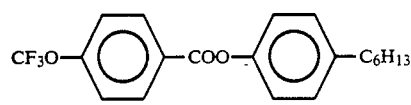
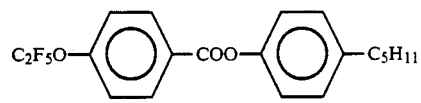
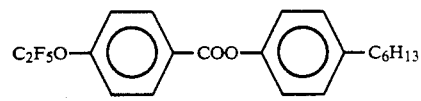
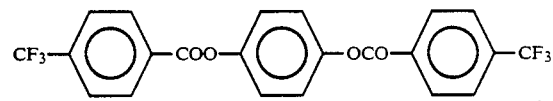
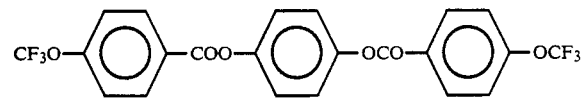
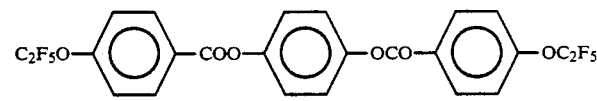
On the other hand, suitable examples of the group B compounds include:
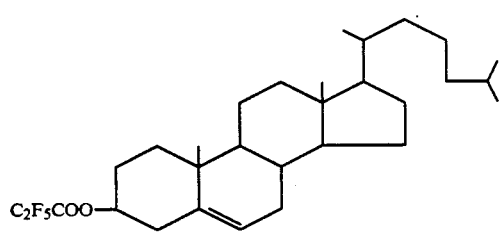
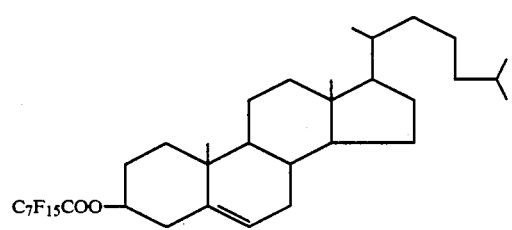

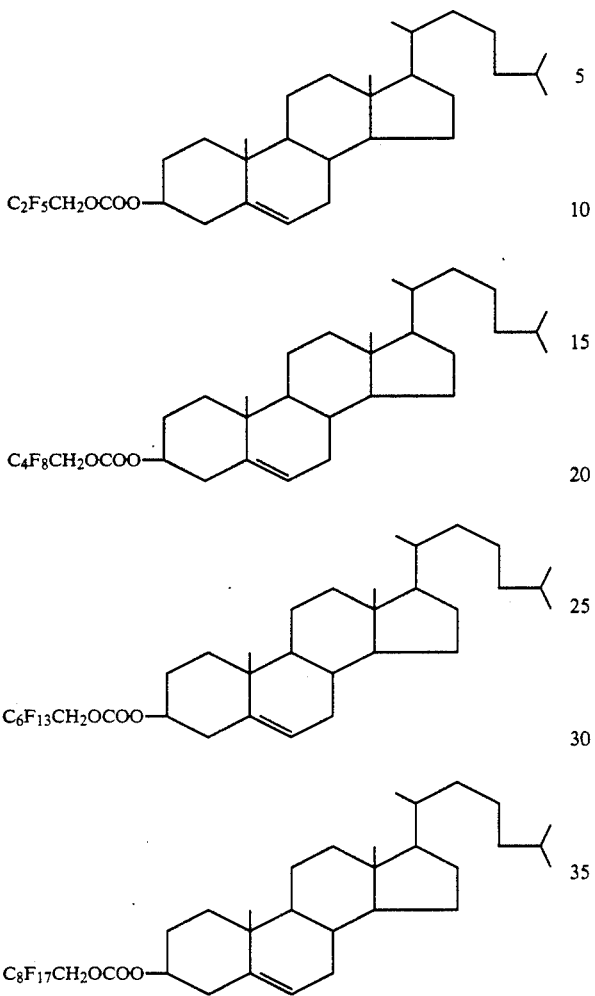

In the present invention, the compound containing a perfluoroalkyl group as described above are added to the basic liquid crystals exhibiting a smectic C phase. The addition amount is in the range of 0.01 to 1% by weight to the basic liquid crystals. When the addition amount is less than 0.01% by weight, it was found not to be suitable since the effect of improving the response or memory characteristics is insufficient. On the other hand, when the addition amount is excess of 1% by weight, it would be not suitable since it may sometime cause undesired effect on the phase system or the orientation property of the basic liquid crystal. Therefore, the addition amount is preferably from 0.01 to 1% by weight in order to attain high speed response or excellent memory property.

As the basic liquid crystal composition exhibiting smectic C phase, there can be used various smectic liquid crystal composition known in the relevant art or mixtures thereof, which contain necessarily at least one optically active compound. Examples of suitable basic liquid crystals include the formulae (II), (III) and (IV):

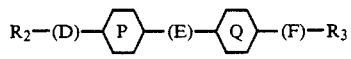
(II)

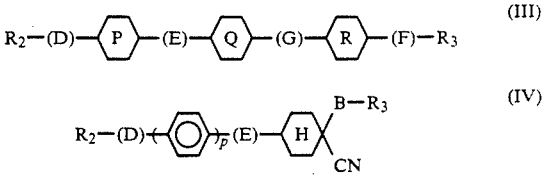

wherein D and F each represents a single bond or a group of COO—, —OCO—, —CH=CH—COO—, —OCO—CH=CH—, —O—, —S—, —OCOO— or —CO—, E and G each represents a single bond or a group of —COO—, —OCO—, —CH=N—, —N=CH—, —CH=CH—, —C≡C—, —CH=CH—COO—, —OCO—CH=CH—, —CH$_2$CH$_2$—, —OCH$_2$—, —CH$_2$O—, —COS— or —SOC—,

represent, independently, a 6- membered ring such as a benzene, pyridine, pyrimizine, pyrazine, pyridazine, piperazine, cyclohexane, pyran, dioxacyclohexane, thiapyran, dithian, thiadiazine, bicyclo(2,2,2)octane or tetrazine ring. Hydrogen atoms in these 6-membered rings may be substituted with fluoro atom, chlorine atom, bromine atom, cyano group, nitro group, a lower alkyl group, a lower alkoxy group or heavy hydrogen. $R_2$ and $R_3$ represent independently a linear or branched alkyl or alkoxy group with 1 to 12 carbon atoms, and the alkyl moiety may include asymmetric carbon in which p is shows an integer of 1 or 2.

It is of course possible to use two or more of the compounds as a mixture.

In practical use, these basic liquid crystals are preferably used by properly mixing them such that they exhibit a smectic C phase near a room temperature and have phase sequence such as IAC or INAC.

A liquid crystal or liquid crystal-compatible compound containing a perfluoroalkyl group added by a specified amount to the basic liquid crystals exhibiting smectic C phase acts for improving the response and memory characteristics of the basic liquid crystals due to the terminal fluoroalkyl group incorporated therein.

EXAMPLE 1

A liquid crystal-compatible compound containing a terminal perfluoroalkyl group (fluoroalkyl compound) represented by the following formula:

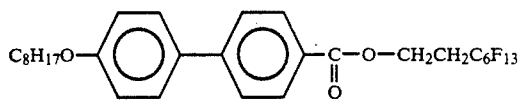

was added by 0.1, 0.2, 0.4, 0.6 and 1% by weight respectively to a commercially available ferroelectric liquid crystal composition exhibiting a smectic C phase (SC-1020; manufactured by Chisso Co., JAPAN), heated once to an isotropic liquid state to completely dissolve all of the composition compounds to prepare five kinds of ferroelectric liquid compositions according to the present invention.

Liquid crystal cells for evaluating the performance were constituted by using the liquid crystal compositions.

Manufacture of liquid crystal cell

As shown in FIG. 1, an SiO₂ film was formed as a protecting layer on a glass substrate on which a patterned ITO (indium oxide) film was formed as an electrode. The SiO₂ film was formed by coating OCD (manufactured by TOKYO OHKA KOGYO CO., LTD. JAPAN) to a film thickness of 1,000 Å by spin coating method and then baking at 350° C.

Further, a PVA film was formed to a film thickness of about 300 as an orientation film on the film described above by spin coating method. Glass substrates each attached with ITO and formed with the protecting layer and the orientation layer as described above were used as upper and lower substrates.

The orientation layer on the substrate was applied with rubbing treatment, SiO₂ beads of 2 μm size were scattered, and the substrates were appended such that the rubbing directions were in parallel with each other and upper and the lower ITO patterns were opposed to each other and used as a liquid crystal cell.

Then, liquid crystal composition put in an isotropic liquid state was injected into the cell and then tightly sealed.

FIG. 1 shows a constitution of the resultant liquid crystal cell. In the drawing, are shown a glass substrate 1, an ITO electrode 2, a protection film 3, an orientation film 4, a liquid crystal composition 5 and sealing member 6 respectively. In the liquid crystal cell for measuring the physical property in this embodiment, there were used ITO film for 2, SiO₂ film for 3 and PVA film for 4.

As the physical property of the thus prepared ferroelectric liquid crystal cell, response speed, Ps, tilting angle and memory angle were measured. The measuring method and definition therefor are shown below.

Setting of cell

A cell filled with liquid crystal composition is placed between two polarization plates in a cross-Nicol state. The cell in fixed such that the direction of the normal line to the layer of the cell has an angle of 22.5° relative to the polarization axis for one of the polarization plates. The response of the liquid crystal composition to an electric field applied to the cell is detected as an optical change of the transmission light intensity by a photo-multiplier through a polarization microscope, and the change of the amount of transmission light is read as electric signals.

Response characteristic

A rectangular wave at 250 Hz, with an offset voltage at 0 V and amplitude of ±10 V is applied to the ITO electrode of the cell at 25° C., and the response of the liquid crystal composition thereto is detected optically as the change of the transmission light intensity and a mean value for each time till 50% intensity change of the transmission light relative to the rising and falling of application pulses is used.

Spontaneous Polarization

A trigonal wave at 80 Hz, with an offset voltage at ON and amplitude of ±10 V is applied to a cell at 25° C. Polarization reversion current thereto is measured and the spontaneous polarization Ps is determined from the area of the polarization reversion peak.

Tilting Angle

A rectangular wave at 250 Hz, with an offset voltage of 0 V and amplitude ±10 V is applied to the cell at 25° C. The extinction direction thereto is determined and one half of the angle is defined as a tilting angle.

Memory Angle

After applying an electric field to the cell at 25° C., the potential of the electrode is reduced to the ground level. The cell is put to a memory state and the extinction direction for the portion memorized in a bright state and the extinction direction of the portion memorized in a dark state in the cell are determined respectively and the difference of the angles between them is defined as a memory angle.

The results of measuring the physical property are shown in Table 1, as well as in FIGS. 2-5.

Figure 2:
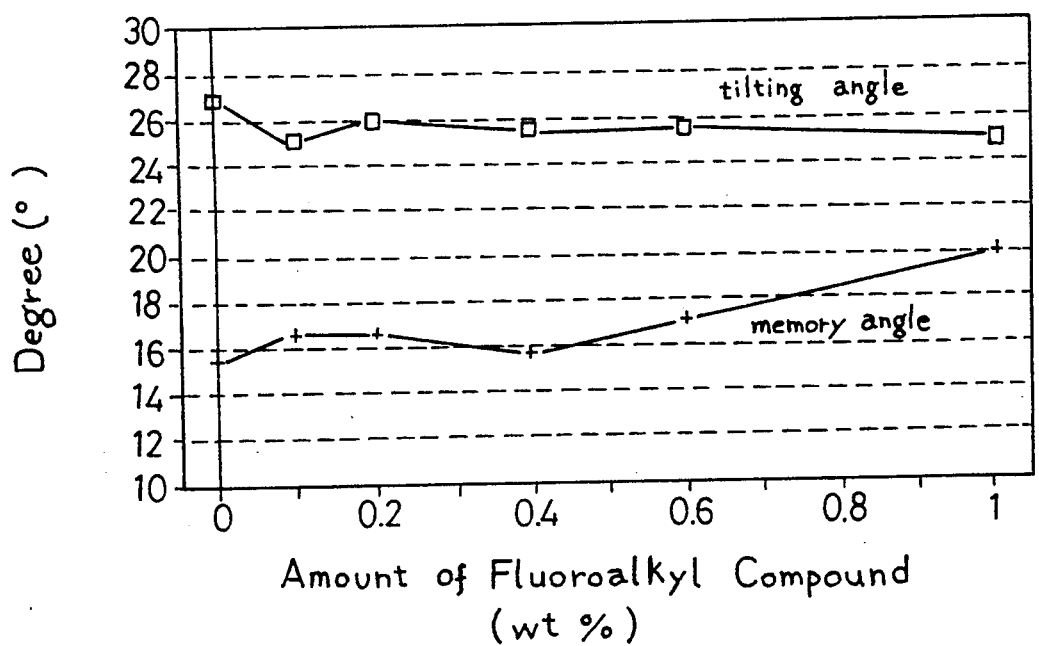
FIGS. 2-5 are, respectively, graphs illustrating various characteristics of liquid crystal display upon using a ferroelectric liquid crystal composition according to the present invention.

In the response speed, the addition effect of the fluoroalkyl compound is shown clearly as in FIG. 2. That is, a faster value is shown for the addition of the fluoroalkyl compound by less than 1 wt % as compared with that of not addition of 0.4 wt %. Further, as shown in FIG. 3, for the memory angle, a trend that the memory angle is increased as the addition amount of the fluoroalkyl compound is increased is developed.

Figure 4:
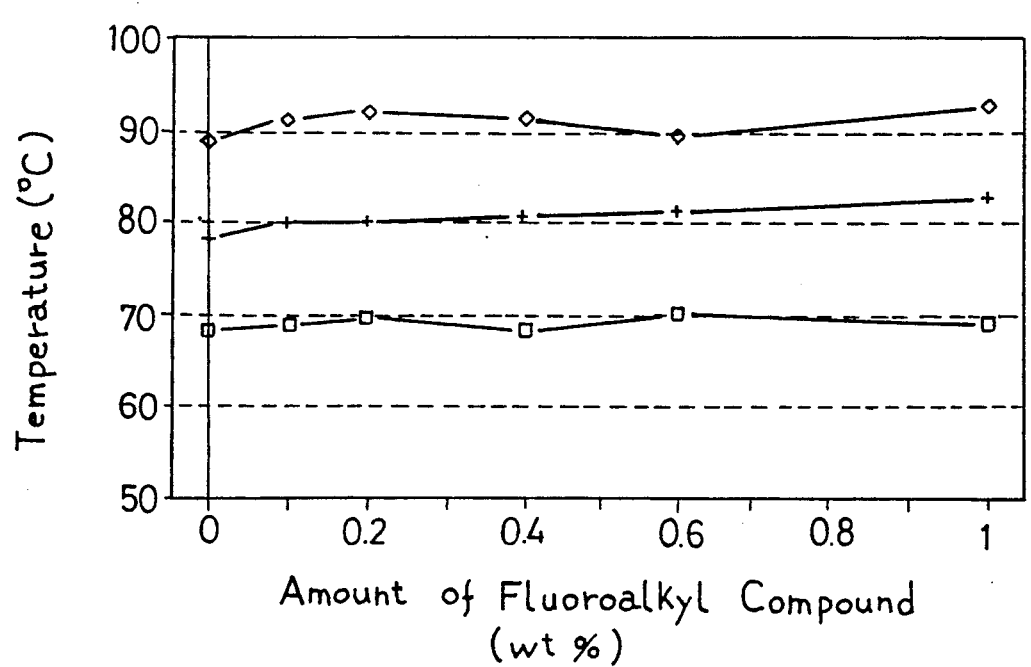

On the other hand, for the transition temperature as shown in FIG. 4, although the temperature varies somewhat by the addition of the fluoroalkyl compound, correlationship with respect to the addition amount is not recognized at all.

Figure 5:
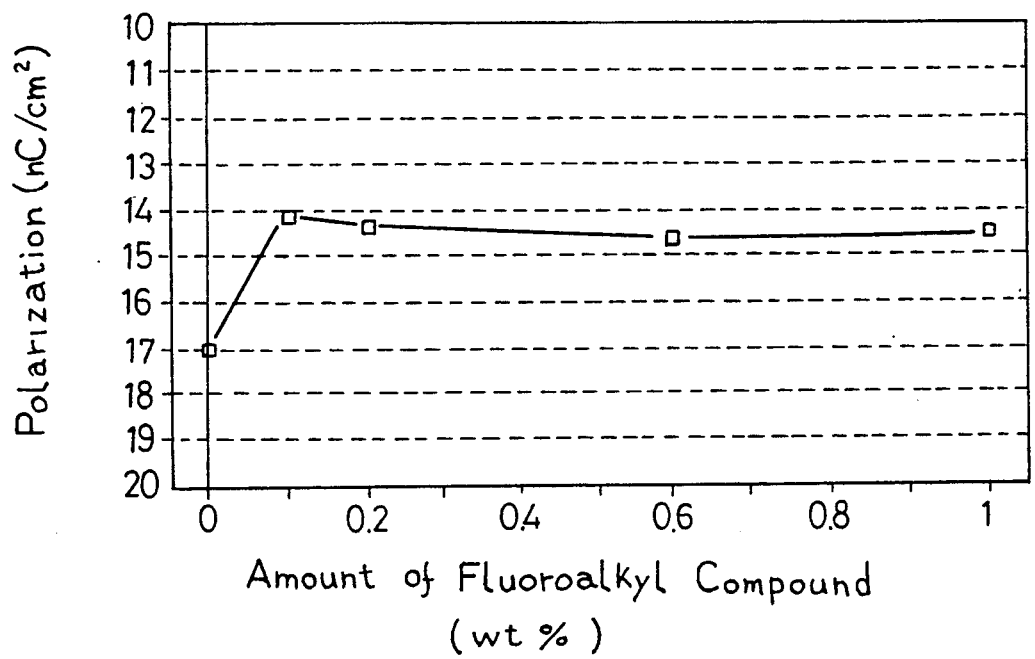

Further for the spontaneous polarization, as shown in FIG. 5, although reduction is recognized by the addition of the fluoroalkyl compound, no correlationship with respect to the addition amount is recognized.

Figure 3:
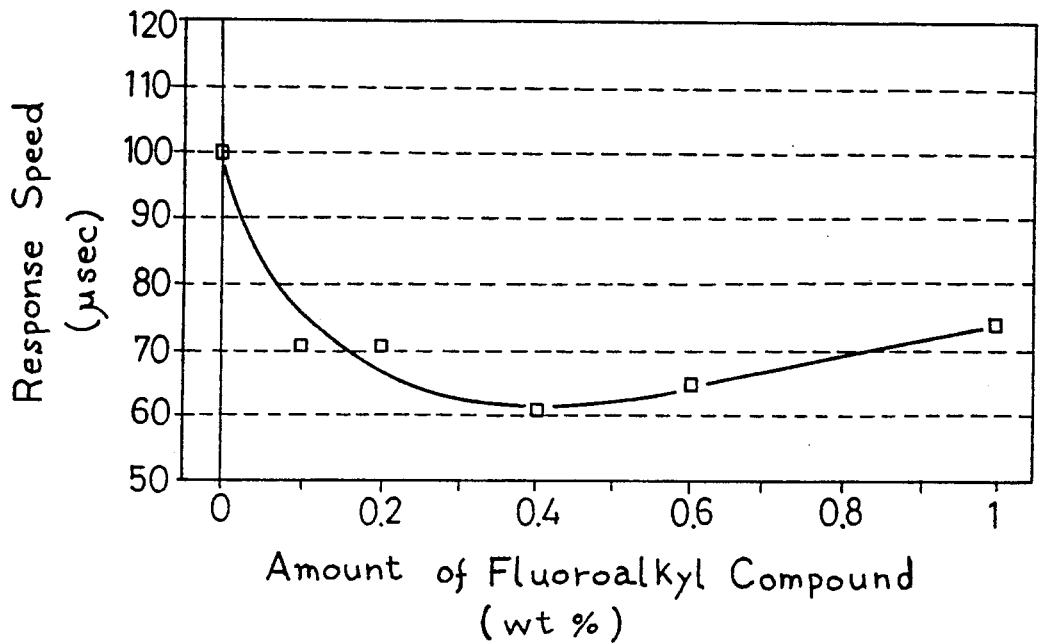

In the same manner, addition effect of the fluoroalkyl compound is not recognized also for the value of the tilting angle in the liquid crystal as shown in FIG. 3.

As has been described above in the present invention, addition of the fluoroalkyl compound within a range from 0.01 wt % to 1 wt % can improve the response speed and the memory angle without giving any undesired effect on the transition temperature, spontaneous polarization and tilting angle.

TABLE 1

| Fluoro-containing compound added (wt %) | Transition temperature | | | Response speed (μ sec) | Spontaneous polarization (nC/cm²) | Tilting angle (ω) | Memory angle (2θ) |
| --- | --- | --- | --- | --- | --- | --- | --- |
| | TAC | TNA | TIN | | | | |
| 0.00 | 68.3 | 78.3 | 89.1 | 100.0 | −17.04 | 26.8 | 15.6 |
| 0.10 | 68.8 | 79.9 | 91.3 | 70.4 | −14.16 | 25.1 | 16.6 |
| 0.20 | 69.5 | 80.2 | 92.2 | 70.4 | −14.40 | 25.9 | 16.6 |
| 0.40 | 68.2 | 80.6 | 91.5 | 60.4 | — | 25.5 | 15.7 |
| 0.60 | 69.9 | 81.2 | 89.6 | 64.6 | −14.66 | 25.6 | 17.1 |
| 1.00 | 68.8 | 82.8 | 93.2 | 73.6 | −14.46 | 25.1 | 20.0 |

EXAMPLE 2

A liquid crystal-compatible compound having a terminal fluoroalkyl group represented by the following formula:

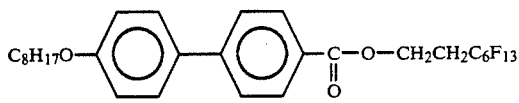

was added at each of rations as shown in Table 2 to other commercially available ferroelectric compositions exhibiting the chiral smectic C phase as exemplified in Table 2 (basic liquid crystals) in the same manner as in Example 1, heated once to an isometric liquid state. Then all of the composition compounds were sufficiently dissolved to prepare ferroelectric liquid crystal compositions according to the present invention.

Physical properties of the liquid crystal compositions were evaluated by constituting liquid crystal cells for evaluating the performance like that in Example 1. The results are also shown together in Table 2.

That is, it can be seen that the response speed is substantially equal or made faster, as compared with the case of no addition. Further, there is no remarkable change by the addition also for the transition temperature.

Further, it can be also seen that improvement for the physical property is less developed by the addition of the fluoroalkyl compound to the ferroelectric liquid crystal compositions of large spontaneous polarization (basic liquid crystals) as compared with the addition of the fluoroalkyl compound to those of small spontaneous polarization.

EXAMPLE 3

The same fluoroalkyl compound as the fluoroalkyl compound used in Example 1 was added at each of the ratios shown in Table 4 to ferroelectric liquid crystal compositions comprising liquid crystals compositions prepared by adding an optically active compound (1)

TABLE 2

| Basic liquid crystal | Basic liquid crystal Manufacturer | Fluoroalkyl compound added | Spontaneous polarization (nC/cm$^2$) | Phase transition temperature (°C.) TAC | TNA | TIN | Response speed (μ sec) | Tilting angle (ω) | Memory angle (2θ) |
|---|---|---|---|---|---|---|---|---|---|
| CS-1020 | Chisso | 0.00% | −19 | 68.3 | 78.3 | 89.1 | 100.0 | 26.8 | 15.6 |
| CS-1020 | Chisso | 0.40% |  | 68.2 | 80.6 | 91.5 | 60.4 | 25.5 | 15.7 |
| CS-1023 | Chisso | 0.00% | −13 | 68.0 | 79.0 | 93.0 | 74.3 | 24.1 | 10.7 |
| CS-1023 | Chisso | 0.40% |  | 67.3 | 76.9 | 92.5 | 67.3 | 23.4 | 9.8 |
| CS-1024 | Chisso | 0.00% | −47 | 62.0 | 83.0 | 90.0 | 50.0 | 24.4 |  |
| CS-1024 | Chisso | 0.40% |  | 53.8 | 81.8 | 90.0 | 50.1 | 22.9 |  |
| ZLI-3654 | Merk | 0.00% | −29 | 62.0 | 76.0 | 86.0 | 75.5 | 23.9 | 14.0 |
| ZLI-3654 | Merk | 0.30% |  | 60.3 | 76.1 | 86.5 | 80.5 | 23.6 | 16.0 |
| ZLI-4237-000 | Merk | 0.00% | −7 | 63.0 | 72.0 | 79.0 | 141.1 | 23.2 | 13.1 |
| ZLI-4237-000 | Merk | 0.28% |  | 61.5 | 70.7 | 78.0 | 116.7 | 23.2 | 14.0 |
| ZLI-4237-100 | Merk | 0.00% | −20 | 61.0 | 73.0 | 73.0 | 56.4 | 23.2 | 12.6 |
| ZLI-4237-100 | Merk | 0.22% |  | 58.7 | 73.0 | 82.3 | 58.6 | 22.8 | 15.1 |
| CHIRACOL-1013 | AdecaArgus | 0.00% | −8 | 53.0 | 67.0 | 70.0 | 89.5 | 20.6 | 13.3 |
| CHIRACOL-1013 | AdecaArgus | 0.21% |  | 50.1 | 67.1 | 72.0 | 84.7 | 21.5 | 12.5 |
| CHIRACOL-1013 | AdecaArgus | 0.40% |  | 50.2 | 67.7 | 70.4 | 80.7 | 21.5 | 12.6 |
| CHIRACOL-1013 | AdecaArgus | 0.70% |  | 50.1 | 67.9 | 71.7 | 97.1 | 20.9 | 11.2 |
| CHIRACOL-1013 | AdecaArgus | 1.00% |  | 50.3 | 68.0 | 70.7 | 79.5 | 20.4 | 12.3 |

As can be seen from the results, the effect of adding the compound having a fluoroalkyl group is developed also in a case where the ferroelectric liquid crystal material as the base material (basic liquid crystals) are quite different.

shown in Table 3 in an amount of 1% by weight to each of optically inactive compounds (2)-(7) shown in Table 3 formulated into a chiral smectic C phase, which was heated to an isotropic liquid state and all of the composition compounds were melted thoroughly and mixed to prepare ferroelectric liquid crystal compositions according to the present invention.

TABLE 3

| Compound | Addition amount |
|---|---|
| 1  C$_8$H$_{17}$O—⟨◯⟩—⟨◯⟩—COOCH(CH$_3$)—⟨◯⟩—C$_8$H$_{17}$ | 1.0% |
| 2  C$_7$H$_{15}$—⟨N◯N⟩—⟨◯⟩—OC$_7$H$_{15}$ | 5.0% |
| 3  C$_7$H$_{15}$—⟨N◯N⟩—⟨◯⟩—OC$_8$H$_{17}$ | 9.9% |

TABLE 3-continued

| | Compound | Addition amount |
|---|---|---|
| 4 | 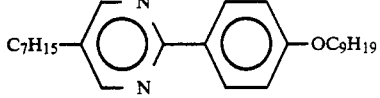 C7H15—〈N=N〉—〈 〉—OC9H19 | 14.8% |
| 5 | 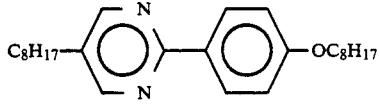 C8H17—〈N=N〉—〈 〉—OC8H17 | 19.8% |
| 6 | 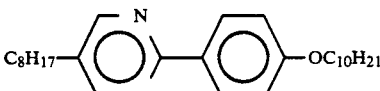 C8H17—〈N=N〉—〈 〉—OC10H21 | 29.7% |
| 7 | 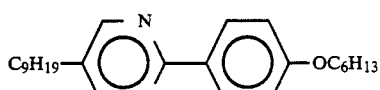 C9H19—〈N=N〉—〈 〉—OC6H13 | 8.3% |

TABLE 4

| Fluoro-alkyl compound added | Transition temperature TAC | TNA | TIN | Response speed (μ sec) | Tilting angle (ω) | Memory angle (2θ) |
|---|---|---|---|---|---|---|
| 0.00% | 48.5 | 62.8 | 68.6 | 428.6 | 13.3 | 9.5 |
| 0.11% | 47.2 | 62.5 | 68.0 | 377.6 | 13.6 | 10.9 |
| 0.47% | 46.9 | 63.0 | 68.2 | 445.3 | 14.4 | 10.2 |
| 0.60% | 46.8 | 63.1 | 68.2 | 625.2 | 15.2 | 14.9 |

The liquid crystal compositions were used to constitute liquid crystal cells for the evaluation of the performance as in Example 1, to evaluate the characteristics. The results are shown in Table 4.

As can be seen from the result, the addition amount of the fluoroalkyl compound has an effect for improving the characteristics based on the specific range of addition and, it can be seen that excess addition deteriorates each of the characteristics. Further, it can also be seen that even the addition of 1% by weight may be already excessive depending on the ferroelectric liquid crystals as an object of the addition.

EXAMPLE 4

Liquid crystal-compatible compounds each containing a terminal fluoroalkyl group as shown in Table 5 were added respectively to other commercially available ferroelectric compositions exhibiting a smectic C phase (CS-1020, manufactured Chisso Co.), once heated to an isometric liquid crystal state and all of the composition compounds were thoroughly melted to prepare ferroelectric liquid crystal compositions according to the present invention. The liquid crystal compositions were used to constitute cells for the evaluation of the performance as in Example 1 and the characteristics thereof were evaluated.

The results are shown in Table 6. As can be seen from the results, there is a difference in the addition effect depending on the structure of the fluoroalkyl containing compounds per se.

TABLE 5

| | Compound |
|---|---|
| F1 | 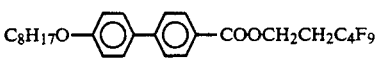 C8H17O—〈 〉—〈 〉—COOCH2CH2C4F9 |
| F2 | 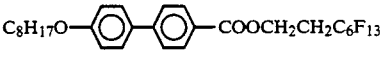 C8H17O—〈 〉—〈 〉—COOCH2CH2C6F13 |
| F3 | 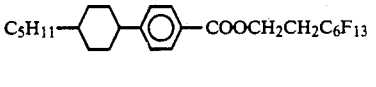 C5H11—〈 〉—〈 〉—COOCH2CH2C6F13 |
| F4 | 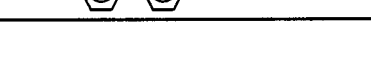 C8H17O—〈 〉—〈 〉—COOCH2CH2C8F17 |

TABLE 6

| Fluoro-alkyl com-pound | Fluoro-alkyl com-pound added | Transition temp. (Deg) TAC | TNA | TIN | Re-sponse speed (μ sec) | Tilt-ing angle (ω) | Mem-ory angle (2θ) |
|---|---|---|---|---|---|---|---|
| | | 68.3 | 78.3 | 89.1 | 60.8 | 25.4 | 12.7 |
| F1 | 0.50% | 68.5 | 79.1 | 91.3 | 65.1 | 25.5 | 13.1 |
| F2 | 0.40% | 68.2 | 80.6 | 91.5 | 60.4 | 25.5 | 15.7 |
| F3 | 0.40% | 68.8 | 79.4 | 91.3 | 64.9 | 25.7 | 13.2 |
| F4 | 0.40% | 68.7 | 79.6 | 91.2 | 67.2 | 25.3 | 12.4 |

The ferroelectric liquid crystal composition according to the present invention contains a predetermined amount of a specific compound having a fluoroalkyl group, and therefore the response speed and the memory characteristic are remarkably improved as compared with those of the conventional similar ferroelectric liquid crystal compositions and, in particular, liquid crystal display device of high speed response attaining large capacity display can be provided conveniently.

Accordingly, the usefulness is extremely great in the relevant field of the art.

What We claimed is:

1. A ferroelectric liquid crystal composition comprising from 0.01 to 1% by weight of a liquid crystal or liquid-crystal compatible compound having a fluoroalkyl group in ferroelectric liquid crystals exhibiting a smectic C phase, said liquid crystal or liquid crystal-compatible compound having the formula (I):

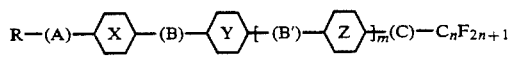 (I)

where ⟨X⟩, ⟨Y⟩ and ⟨Z⟩ each represents a benzene ring, in which one or more of the hydrogen atoms may be substituted by a substituent selected from the group consisting of $CH_3$ and $OCH_3O$, R represents a linear or branched alkyl or perfluoroalkyl group containing 1 to 12 carbon atoms;
A is —O—;
B and B' each represents a single bond;
C is —$COOR_1$—, in which $R_1$ represents a linear alkylene group containing 1 to 8 carbon atoms;
m is an integer of 0 or 1; and
n is an integer of 1 to 10.

2. The ferroelectric liquid crystal composition of claim 1, wherein the liquid crystal or liquid-compatible compound is one having two bivalent 6-membered rings which may be unsubstituted or substituted by a substituent selected from the group consisting of F, $CH_3$ and $OCH_3O$.

3. The ferroelectric liquid crystal composition of claim 1 in which the liquid crystal composition exhibiting smectic C phase shows phase sequence of IAC or INAC.

4. The ferroelectric liquid crystal composition of claim 1, wherein the compound of formula (I) is:

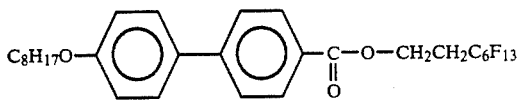

* * * * *